Patented Feb. 21, 1933

1,898,527

UNITED STATES PATENT OFFICE

OTTO EISENHUT, OF HEIDELBERG, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF HYDROGEN AND GAS MIXTURES CONTAINING THE SAME

No Drawing. Application filed December 9, 1927, Serial No. 239,004, and in Germany December 14, 1926.

It has already been proposed to convert solid, liquid or gaseous carbonaceous substances into mixtures of carbon monoxid and hydrogen, containing small amounts of carbon dioxid, by means of steam and the aid of the electric arc, and it has also been proposed, by utilizing the heat of the gases issuing from the said arc for a further conversion of the gases with air, and if necessary with steam to prepare a mixture of one part of nitrogen and three parts of hydrogen, which is suitable for the synthetic production of ammonia, after the carbon monoxid has been converted by steam, in any suitable manner, into carbon dioxid and hydrogen and the carbon dioxid so formed eliminated.

I have now found that solid, liquid or gaseous carbonaceous substances containing hydrogen, or mixtures containing the said substances, such as methane, distillation gases from coal, tars, mineral oils and the like can be converted into a gas substantially consisting of hydrogen or into mixtures of nitrogen and hydrogen suitable for the synthesis of ammonia, by exposing these said substances, in association with air, oxygen or carbon dioxid which substances are hereinafter referred to as "gases capable of reacting with carbon with the exclusive formation of carbon oxides" to the action of an electric arc, converting the resulting carbon monoxid by steam into carbon dioxid and hydrogen, and freeing the resulting gaseous mixture from carbon dioxid and any other impurities. The said gases capable of reacting with carbon with the exclusive formation of carbon oxides may be employed with or without addition of steam. When employing gaseous carbonaceous substances as initial material they are mixed with the gases containing oxygen; liquid initial materials are first vaporized and then treated in the same way as gaseous initial materials, or they are sprayed into the current of gas. Solid carbonaceous materials are best pulverized first and then injected with the aid of the gas needed into the electric arc furnace by means of nozzles. The said treatment almost completely transforms the carbon present in the original substances into carbon monoxid, whilst when suitably adjusting the amount of air admitted, combustion of the free hydrogen already present in the initial material or resulting from the treatment in the electric arc to form water takes place to only an insignificant extent. For example, the methane content of a coke-oven gas may be reduced in one operation from 20 to 25 per cent to less than 1 per cent in the final gaseous mixture.

By operating in this manner with the calculated amount of air, it is possible to obtain directly and without any supplementary addition of hydrogen or nitrogen, a gaseous mixture suitable for the synthesis of ammonia. When operating, however, with greater amounts of air, the resulting mixture does not directly contain nitrogen and hydrogen in the ratio of 1 to 3 in which event hydrogen must be added. If hydrogen is lacking a portion of the original substance may be treated in the same way in a second electric arc furnace, either with oxygen, carbon dioxid or steam, the said gases being hereinafter referred to as a gas containing oxygen free from nitrogen, the principal products being hydrogen and carbon monoxid only. The carbon monoxid is converted with steam, and the resulting hydrogen is used as the additional gas. It is advisable to employ such a quantity of the original substance in this second arc treatment that the resulting hydrogen is exactly sufficient to bring the nitrogen-hydrogen mixture obtained in the first process up to the ratio of 1 to 3.

The consumption of energy in the present process is small, and can be still further reduced by providing suitable heat insulation for the electric arc furnace, and the admission and discharge conduits for the gases, while, at the same time, utilizing the large amount of heat in the effluent gases to preheat the products which are to be treated.

The following example further illustrates the nature of this invention, which however is not restricted thereto.

*Example*

Coke-oven gas, containing 20 per cent of methane and other hydrocarbons, 50 per cent of hydrogen and small quantities of nitrogen, carbon monoxid and carbon dioxid, is exposed to the electric arc in association with about half its own volume of air. The resulting gaseous mixture contains, in addition to small amounts of methane, carbon dioxid and oxygen, a mixture of nitrogen, hydrogen and carbon monoxid which, after converting the carbon monoxid with steam into carbon dioxid and hydrogen and removing the carbon dioxid, furnishes a nitrogen-hydrogen mixture having the ratio of 1 to 3. Without any heat insulation and preheating of the gas to be treated, the consumption of energy amounts to about 1.0 to 1.5 kilowatt-hours per cubic metre of the nitrogen-hydrogen mixture.

When preheating the gases to be treated by means of the hot gases leaving the arc, the consumption of energy can be reduced to about 0.5 to 0.7 kilowatt-hour per cubic metre of the nitrogen-hydrogen mixture.

What I claim is:

1. A process for producing gases containing hydrogen, which comprises exposing a mixture of carbonaceous material containing hydrogen with a gas capable of reacting with carbon with the exclusive formation of carbon oxides to the action of an electric arc, converting the carbon monoxid so formed with the aid of steam into carbon dioxid and hydrogen, and removing the carbon dioxid.

2. A process for producing gases containing hydrogen, which comprises exposing a mixture of carbonaceous material containing hydrogen with air to the action of an electric arc, converting the carbon monoxid formed with the aid of steam into carbon dioxid and hydrogen, and removing the carbon dioxid.

3. A process for producing gases containing hydrogen, which comprises exposing a mixture of carbonaceous material containing hydrogen with air enriched in oxygen to the action of an electric arc, converting the carbon monoxid formed with the aid of steam into carbon dioxid and hydrogen, and removing the carbon dioxid.

4. A process for producing gases containing hydrogen, which comprises exposing a mixture of vaporized carbonaceous material containing hydrogen with a gas capable of reacting with carbon with the exclusive formation of carbon oxides to the action of an electric arc, converting the carbon monoxid so formed with the aid of steam into carbon dioxid and hydrogen, and removing the carbon dioxid.

5. A process for producing gases containing hydrogen, which comprises exposing a mixture of gaseous carbonaceous material containing hydrogen with a gas capable of reacting with carbon with the exclusive formation of carbon oxides to the action of an electric arc, converting the carbon monoxid so formed with the aid of steam into carbon dioxid and hydrogen, and removing the carbon dioxid.

6. A process for producing gases containing hydrogen, which comprises exposing a mixture of gaseous carbonaceous material containing hydrogen with air to the action of an electric arc, converting the carbon monoxid formed with the aid of steam into carbon dioxid and hydrogen, and removing the carbon dioxid.

In testimony whereof I have hereunto set my hand.

OTTO EISENHUT.